July 26, 1927.  1,637,214
D. P. J. BURGUIÉRES
ELASTIC SUSPENSION WHEEL
Filed Sept. 9, 1926   2 Sheets-Sheet 1
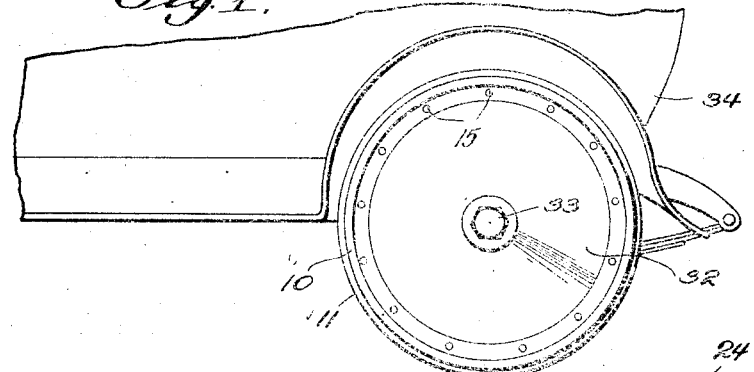
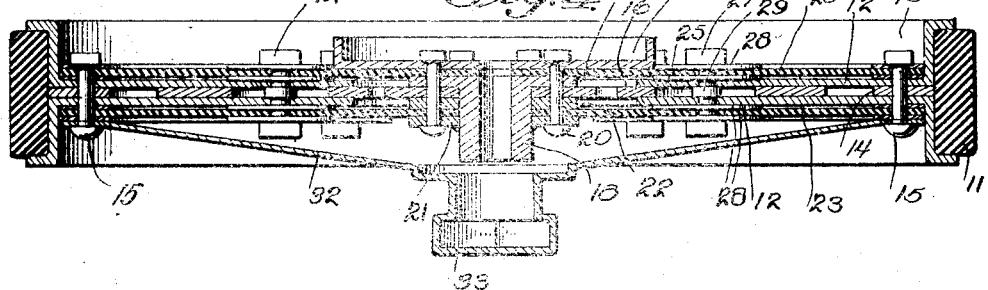
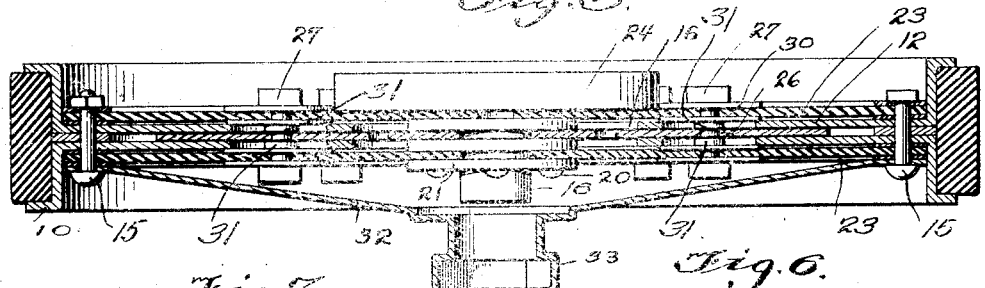
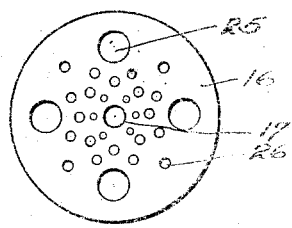
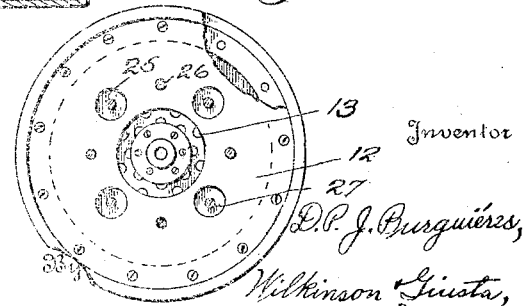
Inventor
D. P. J. Burguiéres,
Wilkinson Giusta,
His Attorneys Patented July 26, 1927.

1,637,214

UNITED STATES PATENT OFFICE.

DENIS P. J. BURGUIÉRES, OF LOUISA, LOUISIANA, ASSIGNOR OF ONE-FOURTH TO GODFREY CHRIST, OF LOUISA, LOUISIANA.

ELASTIC SUSPENSION WHEEL.

Application filed September 9, 1926. Serial No. 134,536.

The present invention relates to resilient wheels, and has for an object to provide a wheel embodying cushioning or shock absorbing features without the use of pneumatic tires or springs, and a wheel which may be used for steering, or driving, and may be used upon passenger and commercial vehicles and the like.

Another object of the invention is to provide a wheel wherein the resilient connecting medium is a rubber disc or sheet which may be used singly or in multiple, and thus adapt the wheel structure to variations in load carrying capacity without sacrificing either the strength of the wheel structure or the resilient qualities which it is desired to impart to the wheel.

Another object of the invention is to provide a wheel structure of this character arranged, so that the resilient or rubber discs may be interchanged or renewed and may be increased or decreased in number with but relatively little work and without the exercise of great skill and labor and without the use of special tools.

Another object of the invention is to provide a wheel structure embodying all of these features and which may be equipped with a disc cover or the like, so as to impart to the wheel the ordinary appearance of a disc wheel, and a wheel which is relatively light in construction, well balanced and which occupies no more space than the average automobile wheel.

With the foregoing and other objects in view, the invention will be more fully described hereinafter, and will be more particularly pointed out in the claims appended hereto.

In the drawings, wherein like symbols refer to like or corresponding parts throughout of several views, Figure 1 is a fragmentary side elevation of the rear end of a motor vehicle equipped with a wheel constructed according to this invention.

Figure 4 is an enlarged transverse section taken on the line 4—4 of Figure 2.

Figure 5 is a similar view taken on the line 5—5 of Figure 2.

Figure 6 is a reduced side elevation of the wheel having the adjacent resilient disc removed, and Figure 7 is a detail side elevation of the floating hub plate employed.

Figure 2:
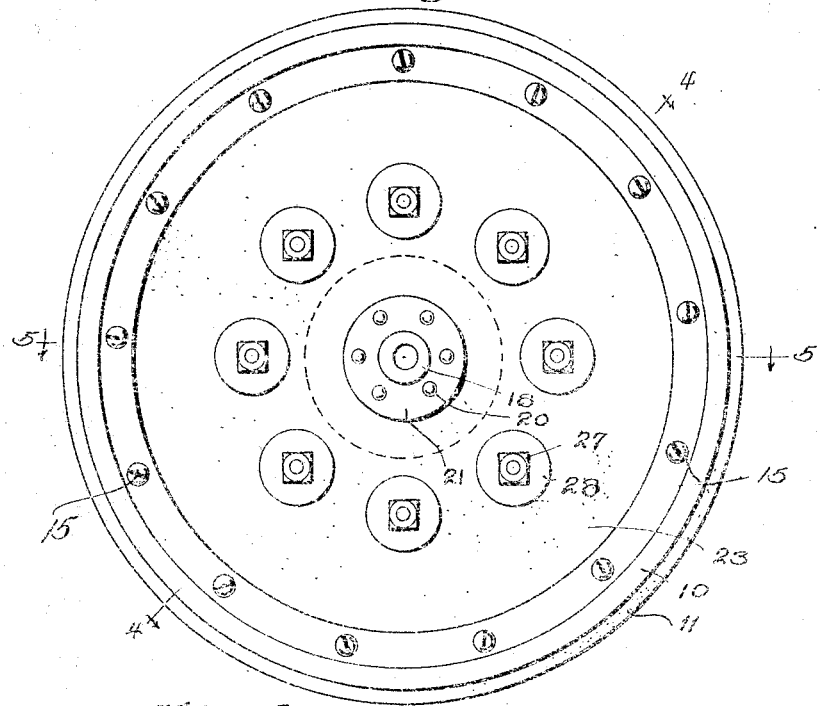
Figure 2 is an enlarged outer side view of a wheel constructed according to this invention with the cover plate of Figure 1 omitted.
Figure 3:
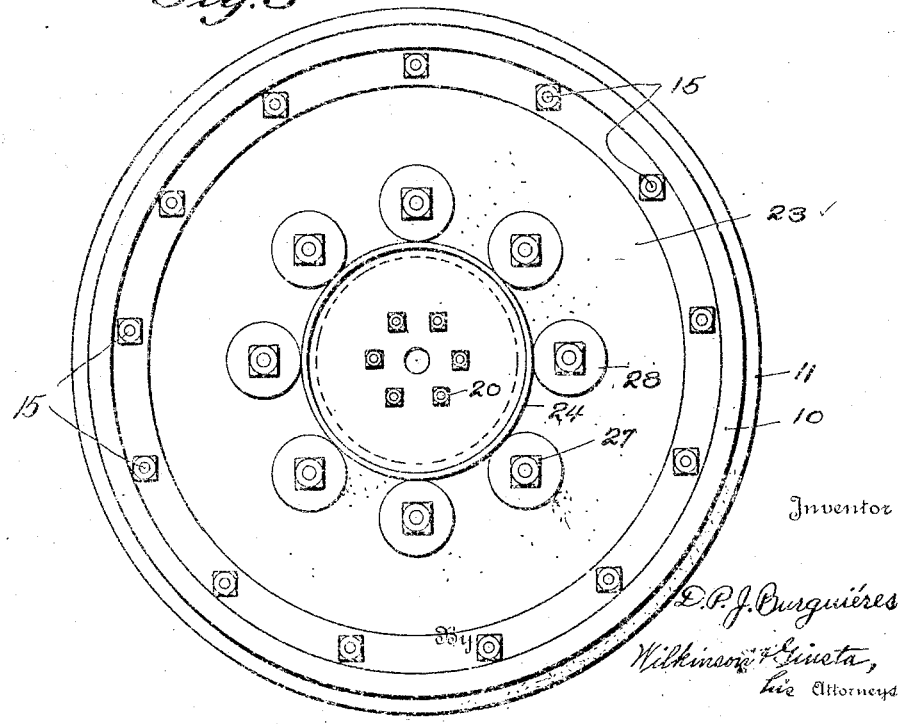
Figure 3 is an elevation of the inner side of the wheel, showing a brake drum applied thereto.

Referring to the drawings, 10 designates a rim or felly of a wheel which is of ordinary construction and which may be equipped with a cushion or solid tire 11 for contact with the roadway. The rim 10 comprises a pair of annular flange sections having inturned flange plates 12, which extend inwardly toward the axis of the wheel, but which terminate in a relatively large annular opening 13, as shown in Figure 6. These flange plates 12 are of similar construction and size and are spaced apart by a spacing ring 14 arranged between the outer edge portions of the plates 12, the plates 12 and the ring 14 being clamped in superposed relation, as shown in Figures 4 and 5, by a series of outer clamping bolts 15. Slidably fitting between the flange plates 12 of the rim is a floating hub plate 16, which is of less exterior diameter than the internal diameter of the spacing ring 14 to permit the plate 16 to have an eccentric movement between the flange plates 12. The plate 16 is provided with a central opening 17 through which a hub 18 may pass, the hub being of any suitable construction and shown in the present instance as having on one end an outturned flange 19 for carrying inner clamping bolts 20, which also engage through the inner portion of the hub plate 16. The hub also carries a clamping ring 21 and a spacing ring 22 for clamping and centering the hub plate 16 upon the hub and also securing one or more resilient discs 23, which are secured at their inner edge portions upon the hub 18. The clamping bolts 20 are arranged in an inner circular series about the hub 18, so as to effectively clamp the portions in the inner marginal edge of each resilient disc 23 with sufficient firmness to support the hub 18 and the load imposed thereon within the rim 10. The bolts 15 are arranged in an outer circular series within the rim 10 and are of sufficient number to firmly clamp the interposed outer edge portions of the resilient discs 23 against the flange plates 12, at the outer edge portions of the latter.

The rim 10 is thus effectively connected to the resilient discs 23. In the drawings there is shown but one resilient disc 23 at each side of the wheel, but it is understood that any desired number within practical limits may be used for obtaining the desired resiliency or strength of the wheel according to the load to be imposed on the wheel.

The inner circular series or row of bolts 20 may also be utilized for clamping a brake drum 24 against the inner side of the wheel and over the inner disc 23, so that the brake drum 24 may be used in the ordinary manner as an internal and external braking member.

The floating plate 16 thus overlaps or extends between the flange plates 12 a sufficient distance to lend the desired rigidity to the wheel against lateral or twisting actions, so that the wheel maintains the rim 10 in a true perpendicular plane to the axis of rotation of the wheel and its hub. The wheel may thus be utilized on the front of a motor vehicle or the like where the wheel is employed in steering the vehicle, and also side play is offset incident to the swinging of the vehicle upon a curve of short radius.

For the purpose of strengthening the wheel and insuring its driving and braking character, the flange plates 12 and the floating plate 16 are each provided with circular rows of openings 25 and 26, the openings 25 being relatively large, while the openings 26 are relatively small and the openings being disposed in an intermediate alternate circular row in the wheel. The arrangement is such that in assembling the wheel the large openings 25 of the floating plate 16 are brought into register with the small openings 26 of the flange plates 12. Anchoring bolts 27 of sufficient size to snugly fit the smaller openings 26 are passed through the registering openings 25 and 26, so that the floating plate 16 is permitted of an eccentric movement between the plates 12 within the limits of the diameter of the larger openings 25. The bolts 27 also pass through the resilient discs 23, so as to clamp the adjacent portions of the discs 23 either directly upon the flange plates 12, or directly upon the bolts 27, the clamping upon the plates and the bolts being in alternate positions throughout the circular row.

This arrangement disposes a relatively short length or area of the resilient discs 23 between the alternate points of attachment of the discs to the flange plates 12 and the floating plate 16 to support the latter in normally true concentric relation within the wheel and to suspend the plate 16 and its hub 18 within the wheel at any portion not only from the top of the rim 10, but also from the bolts 27 of the flange plates 12, which are disposed above the medial horizontal plate of the hub of the wheel.

This alternate clamping of the discs 23 to the plates 12 and the floating plate 16 facilitates the driving and braking action on the wheel without transmitting the sudden jars or impacts in shifting gears, closing the clutch and sudden application of brakes, which is usually imposed upon driving and braking wheels.

It will also be noted from Figure 4 that the bolts 27, which are carried upon the flange plates 12 are provided on opposite ends with clamping washers 28 arranged in pairs and disposed against the opposite sides of the resilient discs 23 to provide a relatively large surface area for clamping the discs 23 to the flange plates 12. These bolts 27 which pass through the small openings 26 of the flange plates, are provided with spacing sleeves 29, which lie between the flange plates 12 and in the large openings 25 of the hub or floating plate 16.

From Figure 5 is will be noted that the bolts 27 are carried in the small openings 26 of the hub plate 16 and that clamping washers 30 are arranged in pairs at opposite sides of the resilient discs 23, but that the inner washers 30 are provided with spacing sleeves or flanges 31 which abut the opposite sides of the hub plate 16 and hold the resilient discs 23 out of contact with the flange plates 12.

The marginal edge portions of the discs 30 and 28, where they overlap the large openings 25, are beveled at their edges or rounded, so as to cam over the marginal edges of the openings 25 and thus prevent any possibility of binding of the washers as they are moved eccentrically with respect to the openings 25.

It is, of course, understood that the arrangement of the washers 28 and 30 may be other than as shown to meet different conditions and so as to accomplish the desired alternate clamping action of the resilient discs 23 upon the rim or flange plates 12 and the floating plate 16.

If it is desired, a conical disc or cover plate 32 may be secured against the outer side of the wheel, as shown in Figures 1, 4 and 5, the cover plate 32 being preferably of metal and secured at its outer marginal edge portion beneath the bolts 15 and having a hub cap structure 33 at its central or apex portion disposed in axial alinement with the hub 18 when in normal position of rest. The structure of the hub cap 33 is such as to permit of the free floating or moving of the hub 18 within the wheel incident to shock and load imposed on the hub.

Should the resilient discs 23 become mutilated or otherwise impaired against use, the bolts 27 may be relied upon to engage the marginal edges of the openings 25 and thus support the floating plate 16 in the wheel and permit of the eccentric rolling or travel of the plate on the marginal edges of the flange plates 12.

In Figure 1 a motor vehicle 34 is shown of the passenger type and upon which one of the wheels is mounted, the cover plate 32 with its hub cap structure 33 being clearly shown, and also illustrating that the wheel has the general appearance of a wheel of ordinary disc type.

It will be noted that from this structure the entire weight of the hub and the parts supported thereon is transmitted to the rim of the wheel through the resilient discs 23, and that by the provision of the openings 25 and 26 with the bolts 27 and washers 28 and 30, the resilient discs 23 are reinforced so that the surface area of the discs is sub-divided into small portions which independently take up the strain and weight and consequently increase the strength and life of the resilient disc 23.

From observing Figure 7 it will be noted that the floating plate or disc 16 is provided with a number of small openings arranged between the openings 25 and 26 and about the central opening 17 to receive graphite or other like lubricant adapted to work between the discs 12 to reduce frictional contact between the parts and prevent scraping or squeaking during operation.

The present wheel is of such structure that it may be advantageously used on trucks or other heavy vehicles, as well as upon light passenger vehicles because in case that the rubber disc 23 should break down for any reason, the vehicle may proceed in its travel at the same rate of speed without damage to the wheel or the running gear, because the floating plate 16 is permitted to move eccentrically to an extent determined by the diameter of the large openings 25 through which the bolts 27 pass.

It is obvious that various changes and modifications may be made in the details of construction and design of the above specifically described embodiment of this invention without departing from the spirit thereof, such changes and modifications being restricted only by the scope of the following claims:—

What is claimed is:—

1. A resilient wheel comprising a rim having a pair of inwardly extending flange plates, a hub member having an annular plate slidably engaging between said flange plates, said flange plates and hub plate having registering large and small openings disposed alternately in a circular row, a resilient disc connecting the hub to the rim, and bolts engaging through said large and small openings and through the adjacent portions of the resilient disc for connecting alternate portions of the resilient disc to the flange plates and the hub plate.

2. A resilient wheel comprising a rim having spaced inwardly extending flange plates, a hub having a hub plate lying between the flange plates, a resilient disc connecting the rim and hub to normally support the latter centrally in the wheel, and a circular row of bolts secured through the resilient disc, the flange plates and the hub plate, said flange plates and hub plates having alternate large and small openings about the bolts for connecting alternate portions of the resilient disc to the flange plates and the hub plate.

DENIS P. J. BURGUIÉRES.